No. 710,577. Patented Oct. 7, 1902.
C. H. HAWKINS.
ROTARY ENGINE.
(Application filed Nov. 13, 1901.)
(No Model.) 2 Sheets—Sheet 1.

WITNESSES:
A. R. Appleman
M. F. Boyle

INVENTOR
C. H. Hawkins
BY
Thomas Drew Stetson
ATTORNEY

No. 710,577. Patented Oct. 7, 1902.
C. H. HAWKINS.
ROTARY ENGINE.
(Application filed Nov. 13, 1901.)
(No Model.) 2 Sheets—Sheet 2.

WITNESSES:
A. R. Appleman
M. F. Boyle

INVENTOR
C. H. Hawkins
BY
Thomas Drew Stetson
ATTORNEY

UNITED STATES PATENT OFFICE.

CYRUS H. HAWKINS, OF BROOKLYN, NEW YORK.

ROTARY ENGINE.

SPECIFICATION forming part of Letters Patent No. 710,577, dated October 7, 1902.

Application filed November 13, 1901. Serial No. 82,093. (No model.)

*To all whom it may concern:*

Be it known that I, CYRUS H. HAWKINS, a citizen of the United States, residing in the borough of Brooklyn, in the city and State of New York, have invented a certain new and Improved Rotary Engine; and I do hereby declare that the following is a full and exact description thereof.

My improved machine may serve also as a pump and with the use of compressed air or other fluid; but I will describe it as working with steam to produce motive power. Many of the details, as the bolts which strongly and tightly confine the parts together, the stuffing-boxes and packing to maintain tight and easy fitting surfaces, a massive bed, and strong and adjustable bearings of the shaft in such bed, may be omitted or only partially treated.

My improved engine is of the class in which a drum carrying radially-movable slides, which I will call "wings," is mounted in an eccentric position within a stationary cylinder. This class of engines has long been known and approved. My invention contributes to reduce objections and to make the engine more efficient and durable.

One feature relates to supporting the wings. I practically widen the wings without weakening the drum.

Another feature relates to means for moving the wings and for packing such construction.

Another feature relates to the provisions for distributing steam through a steam-chest and reversing-valve, the provision of two sets of cylindrical rods moving outward and inward with the wings, one rigidly connected and the other capable of shifting laterally, with provisions for bringing steam to act on the latter properly packed.

Another feature consists in provisions for adjusting the end to compensate for the slight yielding, technically springing, which obtains when the fluid in the interior exerts a strong pressure.

Another feature lies in peculiar provisions for both adjustably holding such movable end and packing and covering the joint around such end.

The following is a description of what I consider the best means of carrying out the invention.

The accompanying drawings form a part of this specification.

Figure 1:
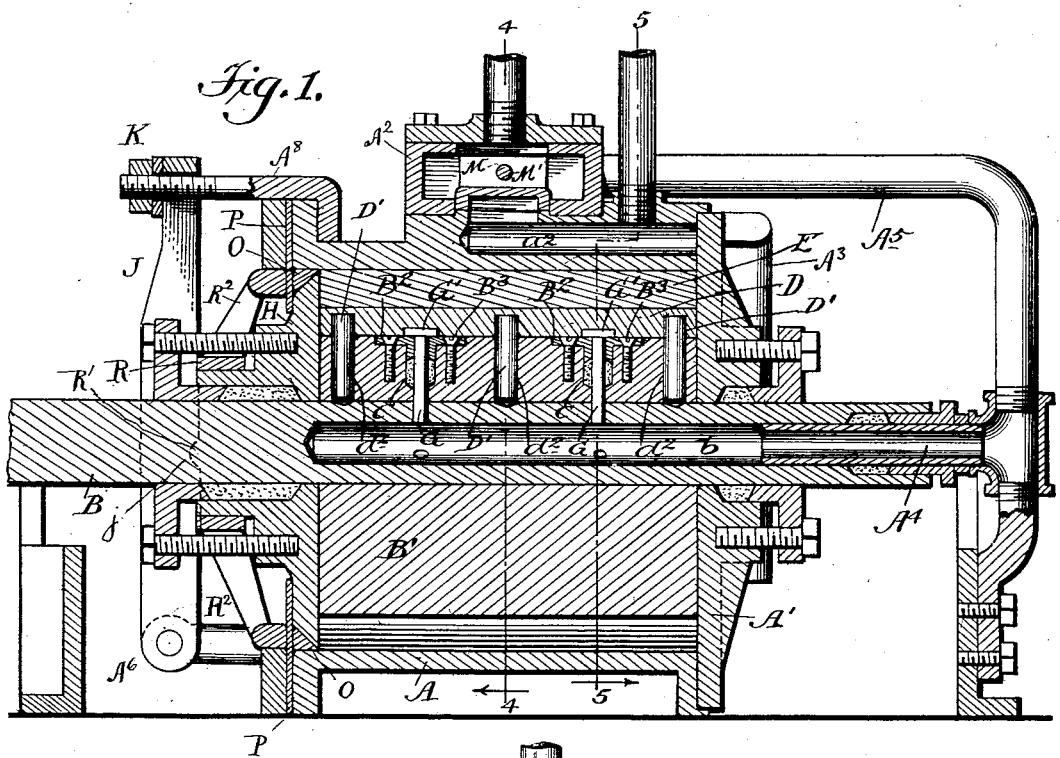
Figure 2:
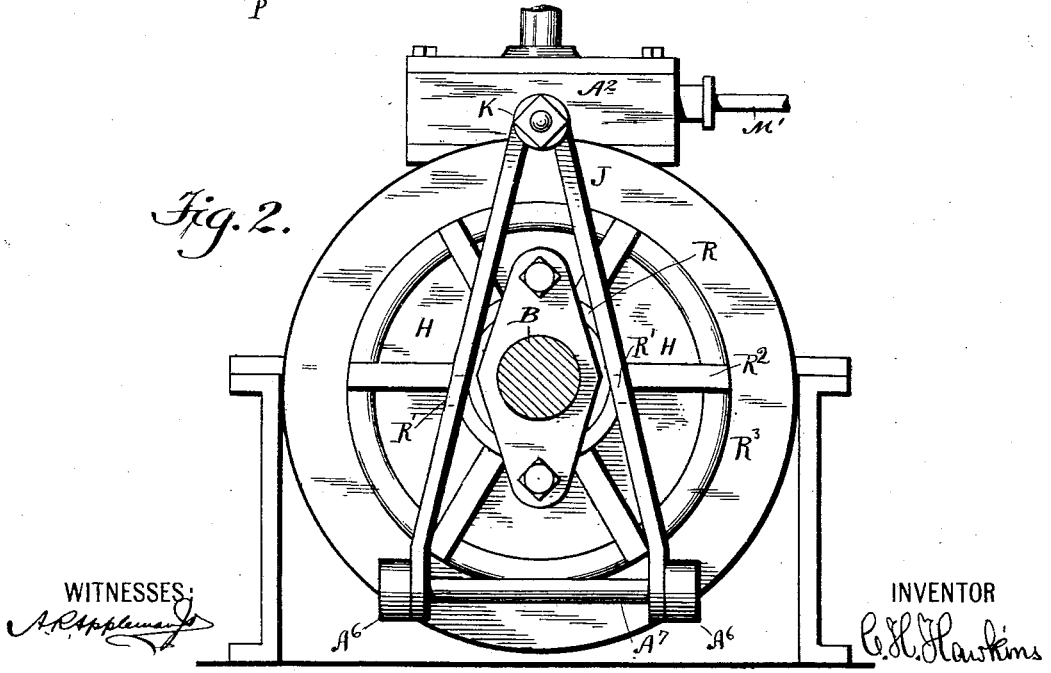
Figure 3:
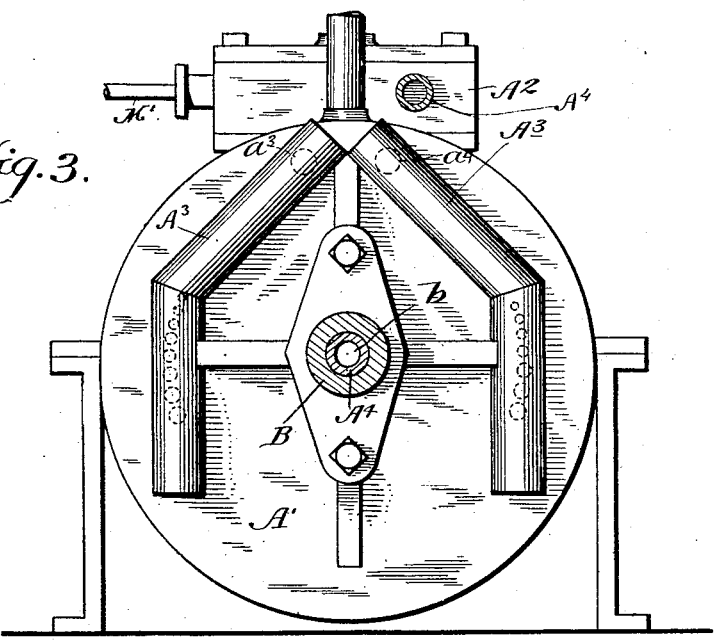
Figure 4:
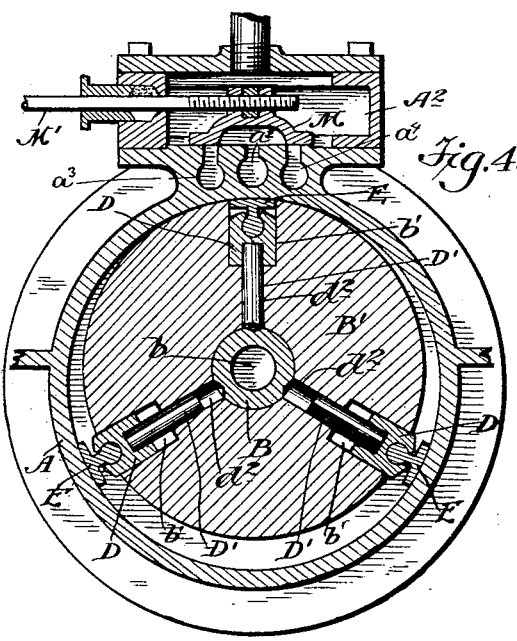
Figure 5:
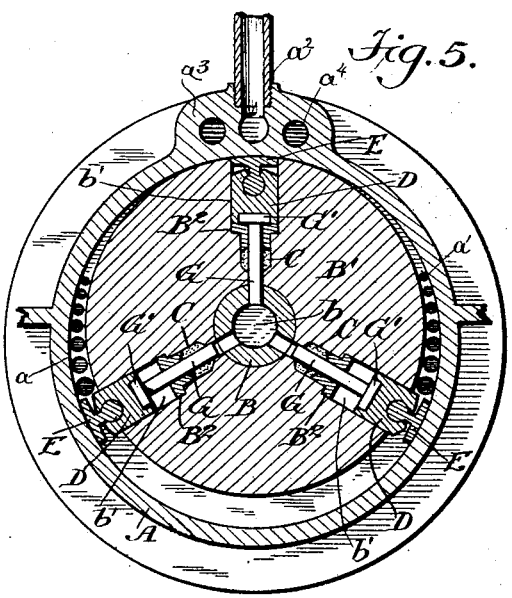

Figure 1 is a central longitudinal section. Fig. 2 is an end view seen from the left in Fig. 1. Fig. 3 is an end view as seen from the right in Fig. 1. Fig. 4 is a cross-section on the line 4 4 in Figs. 1 and 2. Fig. 5 is a cross-section on the line 5 5 in the same figures.

Similar letters of reference indicate corresponding parts in all the figures where they appear.

A is the cylinder, and A' a fixed head having sufficient apertures $a\,a'$, serving as steam and exhaust ports, respectively. Passages cored or otherwise produced in the exterior of the end A' conduct steam from a steam-chest $A^2$, which incloses a reversing-valve M, having a hollow throat and an operating valve-rod M', by which it may be changed in position. Thus steam may be admitted from the steam-chest $A^2$ through the passage inclosed in either of the stout ridges $A^3$ or exhausted into the atmosphere, according as the reversing-valve M is set. There are two of these ridges $A^3$, (see Fig. 5,) one inclosing the left-hand passage, leading from the port $a^3$ under the reversing-valve to the port $a$ in the cylinder end, and the other inclosing the right-hand passage, leading from the port $a^4$ under the reversing-valve to the port $a'$ in such end.

B is a stout shaft mounted eccentrically within the cylinder A and bored or otherwise made hollow a sufficient portion of its length and equipped with a stuffing-box and connections to receive steam at any pressure desired and allow it by its pressure to force out the wings, to be presently described. The steam will also yield when compelled to at another portion of the revolution to allow the wings to be successively forced inward, as required. The form of the connections may be varied. As shown, $A^4$ is a stationary pipe extending axially into the hollow end of the shaft through a stuffing-box revolving with the shaft. This pipe connects by a pipe $A^5$ with the steam-chest.

B' is a drum, of cast-iron or other suitable material, keyed or otherwise firmly set on the shaft B. It is of such size relatively to the eccentricity that it touches the interior of the cylinder A along one line, shown as the upper side of the cylinder. It carries three equidistant wings D, mounted in deep radial channels $b'$ in the drum and capable of moving radially therein. The outer edge of each wing is equipped with a slightly-rocking face-piece E, which latter presents a broad surface finished to match steam-tight against the interior of the cylinder A. In the inner edge of each wing are rigidly set straight pins $D'$, which are received in corresponding cylindrical holes $d^2$ in the drum. This construction contributes to the support of the wing in the correct radial position when it is forced out, so that its projecting end and the connected rocking piece are strongly acted on circumferentially by the steam, urging the drum and its connections to revolve.

G G are nicely-finished pieces, which I will designate "pistons," each having a slightly-swelled head $G'$, received in the inner edge of the wings. These cylindrical pieces extend inward and receive pressure from the steam-reservoir $b$ in the axial line of the shaft. They are inclosed in packing C, compressed by glands $B^2$, carried in the drum $B'$, which may be adjusted at long intervals by screws $B^3$. The shaft carries a pulley $B^4$, through which power is communicated by a belt in the obvious manner. The heads $G'$ on the pistons G are enlarged, matching in corresponding but slightly-larger recesses in the inner edge of the wings. The looseness need only be sufficient to allow the pistons to shift a little relatively to the wings as the packing or other circumstances shall require. The heads limit definitely the inward movement of the pistons. The packing C around the pistons G should be of a durable kind. Any good form of metallic packings will serve. The contact of the pieces E with the interior of the cylinder forces inward each wing during half of a revolution and controls its movement outward during the remaining half. The pressure of the fluid received through the pipe $A^4$ and obtaining practically constant within the bore $b$ acts against the inner ends of the pistons G and presses them and the connected wings outward. The result is to keep the outer faces of all three of the rocking pieces G always in steam-tight contact with the interior of the cylinder A when the machine is conditioned for working.

I have devised a form of the parts which gives great stiffness. The apertures or ports $a\ a'$ through the fixed end, one of which ports, according as the reversing-valve M is set, admits the steam to the interior of the machine to compel the rotatory motion and the other of which allows the exhaust-steam to escape after it has done its work, are necessarily narrow to agree with the narrow spaces between the outer surface of the drum $B'$ and the inner surface of the cylinder A. I make each of these ports by a row of small apertures. In other words, I simply drill a series of holes at the localities $a\ a'$, graduated in diameter to correspond with the wedge-shaped form of the space. The metal left between each hole and the next gives stiffness and strength to the end. This end is further stiffened as follows: The portions $A^3$ of the casting, which, with the main body $A'$ of the end, forms the passages, being made thick and cast integral with the cylinder end, contribute greatly to its stiffness. They each perform two functions—the strengthening of the end and the conducting of the steam to or from one of the ports $a$ or $a'$. The opposite end H of the cylinder is yielding. Its edge is beveled, as shown, and fits tightly by the aid of packing O of corresponding triangular cross-section. The end is thick and stout and is made more rigid by radial ribs. Properly out of the center is a provision for an efficient stuffing-box and gland, as will be understood. The packing-space is bridged over by a plate P, of steel or other elastic material which can yield outward and inward to a sufficient extent to allow the small amount of adjustability required in the end. I provide for exerting an adjustable pressure on this plate, and consequently on both the cylinder end and the packing which tightens the edge thereof, by the following means.

$A^6\ A^6$ are two stationary knuckles carrying a stout axial pin $A^7$, on which latter is pivoted a triangular lever J, the position of which is controlled by a nut K and bolt $A^8$, engaged strongly with the upper edge of the cylinder. The nut can be shifted rapidly and easily in position, as variations in the external force on the head are required. There are rounded notches $j$ near the mid-length of this lever. These notches receive correspondingly-rounded bearings $R'$ on a ring R, which surrounds the stuffing-box of the cylinder end H. This ring may be larger than shown and concentric to the cylinder A; but I have shown it as concentric to the shaft and having the bearings a little below its mid-height. With either arrangement there are divergent arms $R^2$, making the device technically a spider, bearing on a ring $R^3$, which latter presses on the plate P. When the engine is for any reason required to be revolved with only a slight pressure in its interior, the attendant slackens the single conveniently-accessible nut K and the cylinder end is allowed to move outward the small amount required, which with sound metal and sufficiently massive proportions will usually be only a few thousandths of an inch. Under ordinary conditions when the engine is working with a strong pressure in its interior the nut K, being correspondingly screwed inward upon its bolt $A^8$, exerts a strong pressure through the lever and spider on the elastic plate P, and thus both presses the packing O and urges the entire cylinder end inward. It will be seen that this provides an efficient adjustment by which any amount of pressure in the fluid operating the machine can be compensated for by urging the cylinder end more strongly inward. The adjustment should be such as to balance the pressure and keep the ends of the cylinder always in contact, but without pressing so strongly against the ends of the drum B', wings D, and rocking pieces E as to involve serious friction.

When for any reason I stop the engine for a brief period, I do this without turning off the steam at the throttle, (not shown,) but simply by setting the reversing-valve M in the central position, that shown in Fig. 4. This has the effect to shut off the steam from the ports, but leaves it full on in the pipe $A^5$, which communicates directly with the steam-chest above the reversing-valve. It follows that during the whole period while the engine remains stationary under those conditions the full pressure of the steam is kept in the hollow interior $b$ of the shaft B, and consequently pressing with full force outward on the pistons, holding the wings and their connections properly out in contact with the interior of the cylinder. By thus insuring the correct position of the wings the engine is ready to start the moment the reversing-valve is shifted either way, either to the full extent to give full pressure or partly to give reduced pressure in the working.

I claim as my invention—

1. In a rotary engine or pump a cylinder A with an eccentrically-inclosed drum B' and radially-moving wings D and hollow shaft B with connections for receiving fluid at a high pressure, in combination with pistons G carried in the drum so that the steam urges out the wings with yielding force, and with packing C around such pistons compressed by glands $B^2$ and operating means $B^3$ accessible by drawing out the wings, all substantially as herein specified.

2. In a rotary engine or pump having a cylinder A with an eccentrically-inclosed drum B' and radially-moving wings D carried in the latter the pins D' stiffly fixed thereon working in corresponding holes in the drum, and the loosely-connected pistons G playing also in corresponding holes in the drum and pressed outward by the steam against such wings, with liberty for the wings and these loose pistons to shift laterally relatively to each other, all substantially as herein specified.

3. In a rotary engine or pump having a cylinder A with an eccentrically-inclosed drum B' and radially-moving wings D carried in the latter, the pins D' stiffly fixed thereon working in corresponding holes in the drum, and the loosely-connected pistons G playing also in corresponding holes in the drum and pressed outward by the steam against such wings with liberty for the wings and these loose pistons to shift laterally relatively to each other, and with a passage $A^5$ connecting the steam-chest with the hollow shaft to force out such pistons and allow their return and also with passages $A^3$ formed integrally with the cylinder end A' and with a reversing-valve M in the steam-chest controlling such passages for supplying and exhausting steam to act circumferentially on the wings, all combined and arranged for joint operation substantially as herein specified.

4. In a rotary engine or pump having a cylinder A with an eccentrically-inclosed drum B' and radially-moving wings, a movable end H, in combination with the lever J turning on suitable knuckles $A^6$ and rocking bearings $j$ and with adjusting means K adapted to allow such end to be forced inward or release to compensate for the elastic springing of the end, substantially as herein specified.

5. In a rotary engine or pump having a cylinder A with an eccentrically-inclosed drum B' and radially-moving wings, a movable end H fitting easily in the cylinder, in combination with the lever J turning on suitable knuckles $A^6$ and rocking bearings $j$ and with adjusting means K and with a spider R $R^2$ serving as a medium between the lever J and the end H and with packing O an elastic annular plate P receiving force from such spider, arranged to serve both for adjustably holding the end and closing the joint around it, all substantially as herein specified.

In testimony that I claim the invention above set forth I affix my signature in presence of two witnesses.

CYRUS H. HAWKINS.

Witnesses:
J. B. CLAUTICE,
M. F. BOYLE.